(12) United States Patent
Maeda (10) Patent No.: US 11,554,500 B2
(45) Date of Patent: Jan. 17, 2023

(54) ENCODER, MOTOR, AND ROBOT (71) Applicant: Seiko Epson Corporation, Tokyo (JP)

(72) Inventor: Akitoshi Maeda, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 855 days.

(21) Appl. No.: 16/434,260

(22) Filed: Jun. 7, 2019

(65) Prior Publication Data
US 2019/0375113 A1 Dec. 12, 2019

(30) Foreign Application Priority Data
Jun. 8, 2018 (JP) .............................. JP2018-110208

(51) Int. Cl.
| | | |
|---|---|---|
| *H02K 11/215* | (2016.01) | |
| *B25J 13/08* | (2006.01) | |
| *H02K 11/22* | (2016.01) | |
| *B25J 9/12* | (2006.01) | |
| *B25J 18/00* | (2006.01) | |
| *H02K 11/20* | (2016.01) | |
| *G01D 5/347* | (2006.01) | |
| *H02K 37/00* | (2006.01) | |
| *G01D 5/14* | (2006.01) | |

(52) U.S. Cl.
CPC .............. *B25J 13/088* (2013.01); *B25J 9/126* (2013.01); *B25J 18/00* (2013.01); *G01D 5/34794* (2021.05); *H02K 11/20* (2016.01); *H02K 11/22* (2016.01); *G01D 5/142* (2013.01); *H02K 11/215* (2016.01); *H02K 37/00* (2013.01)

(58) Field of Classification Search
CPC ......... B25J 13/088; B25J 9/126; H02K 11/20; H02K 11/22; H02K 11/215; H02K 37/00
See application file for complete search history.

(56) References Cited

U.S. PATENT DOCUMENTS

| | | | |
|---|---|---|---|
| 4,205,308 A * | 5/1980 | Haley .................... | B25J 9/1676 414/139.6 |
| 4,990,909 A | 2/1991 | Ueda et al. | |
| 5,006,703 A | 4/1991 | Shikunami et al. | |
| | (Continued) | | |

FOREIGN PATENT DOCUMENTS

| | | |
|---|---|---|
| CN | 102200452 A | 9/2011 |
| JP | S58-101173 U | 7/1983 |
| | (Continued) | |

*Primary Examiner* — Muhammad S Islam
(74) *Attorney, Agent, or Firm* — Yu Gang (57) ABSTRACT

An encoder including a rotary disc that rotates around a rotating shaft, and a sensor that detects a rotational position of the rotary disc, in which the rotary disc is provided with first patterns and second patterns, the first patterns are arranged at positions obtained by equally dividing a first circumference which is a circumference of a first circle into M (M is natural number of 2 or more) at intervals, the second patterns are arranged at positions obtained by equally dividing a second circumference which is a circumference of a second circle which is a concentric circle of the first circle and has a different radius from that of the first circle into N (N is natural number of 2 or more) at intervals, and M and N are different from each other and a greatest common divisor of M and N is 1.

5 Claims, 6 Drawing Sheets

(56) References Cited

U.S. PATENT DOCUMENTS

| | | | |
|---|---|---|---|
| 8,492,704 B2* | 7/2013 | Villaret | G01D 5/2492 |
| | | | 341/9 |
| 8,829,421 B2* | 9/2014 | Noguchi | G01D 5/34784 |
| | | | 356/616 |
| 8,896,256 B2* | 11/2014 | Yoshida | G05D 3/125 |
| | | | 318/560 |
| 9,562,794 B2* | 2/2017 | Yoshida | G01D 5/34776 |
| 2011/0049341 A1* | 3/2011 | Nakajima | G01D 5/347 |
| | | | 250/231.1 |
| 2011/0227518 A1 | 9/2011 | Inoue et al. | |
| 2012/0153135 A1 | 6/2012 | Ishizuka | |
| 2013/0320201 A1 | 12/2013 | Noguchi et al. | |
| 2015/0123587 A1* | 5/2015 | Yoshida | G01D 5/34792 |
| | | | 310/68 B |

FOREIGN PATENT DOCUMENTS

| | | |
|---|---|---|
| JP | H0295209 A | 4/1990 |
| JP | H02114121 A | 4/1990 |
| JP | H0333614 A | 2/1991 |
| JP | H06-100482 B2 | 12/1994 |
| JP | H08-030660 B2 | 3/1996 |
| JP | 2005080473 A | 3/2005 |
| JP | 2012-127818 A | 7/2012 |
| JP | 2016086538 A | 5/2016 |

* cited by examiner

ENCODER, MOTOR, AND ROBOT

The present application is based on, and claims priority from, JP Application Serial Number 2018-110208, filed Jun. 8, 2018, the disclosure of which is hereby incorporated by reference herein in its entirety.

BACKGROUND

1. Technical Field

The present disclosure relates to an encoder, a motor, and a robot.

2. Related Art

A synchronous motor can generate a torque by applying a current at a position having an angle with respect to a magnetic pole position of a rotor. Therefore, it is necessary to know a positional relationship between the magnetic pole position of the rotor and a stator through which the current flows. Normally, detection of a phase is performed by taking a pulse generated by a pulse generator such as an encoder attached to the rotor of an electric motor into a phase detector formed of a counter and the like to detect the phase.

For example, an optical rotary encoder is disclosed which performs detection by distinguishing rotational positions (angles) using different slits (pitch and width are different from each other, and case where transmittance is different is included) and using sensors having different resolutions (for example, refer to JP-UM-A-58-101173).

However, in JP-UM-A-58-101173, since the rotational positions are distinguished using different slits (transmittance, width, pitch, and the like), sensors with different resolutions are required for each slit, a configuration is complicated, and as a result, a problem of increase in manufacturing cost arises.

SUMMARY

An encoder according to an aspect of the present disclosure includes a rotary disc that rotates around a rotating shaft, and a sensor that detects a rotational position of the rotary disc, in which the rotary disc is provided with first patterns and second patterns, the first patterns are arranged at positions obtained by equally dividing a first circumference which is a circumference of a first circle into M (M is natural number of 2 or more) at intervals, the second patterns are arranged at positions obtained by equally dividing a second circumference which is a circumference of a second circle which is a concentric circle of the first circle and has a different radius from that of the first circle into N (N is natural number of 2 or more) at intervals, and M and N are different from each other and a greatest common divisor of M and N is 1.

In the encoder, a width at a center of each of the first patterns in a radial direction and a width at a center of each of the second patterns in a radial direction may be the same length as each other, and a width of a center between the first patterns in the radial direction and a width at a center between the second patterns in the radial direction may be the same length as each other.

In the encoder, a ratio of the width at the center of each of the first pattern in the radial direction to the width at the center between the first patterns in the radial direction may be 1:1, and a ratio of the width at the center of each of the second patterns in the radial direction to the width at the center between the second patterns in the radial direction may be 1:1.

A motor according to another aspect of the present disclosure includes a rotary disc that rotates around a rotating shaft, and a sensor that detects a rotational position of the rotary disc, in which the rotary disc is provided with first patterns and second patterns, each of which has a predetermined width in a direction orthogonal to a radial direction, the first patterns are arranged at positions obtained by equally dividing a first circumference which is a circumference of a first circle into M (M is natural number of 2 or more) at intervals, the second patterns are arranged at positions obtained by equally dividing a second circumference which is a circumference of a second circle which is a concentric circle of the first circle and has a different radius from that of the first circle into N (N is natural number of 2 or more) at intervals, and M and N are different from each other and a greatest common divisor of M and N is 1.

A robot according to still another aspect of the present disclosure includes a motor that includes a rotating shaft, and an encoder that includes a rotary disc which rotates around the rotating shaft, and a sensor which detects a rotational position of the rotary disc, in which the rotary disc is provided with first patterns and second patterns, each of which has a predetermined width in a direction orthogonal to a radial direction, the first patterns are arranged at positions obtained by equally dividing a first circumference which is a circumference of a first circle into M (M is natural number of 2 or more) at intervals, the second patterns are arranged at positions obtained by equally dividing a second circumference which is a circumference of a second circle which is a concentric circle of the first circle and has a different radius from that of the first circle into N (N is natural number of 2 or more) at intervals, and M and N are different from each other and a greatest common divisor of M and N is 1.

DESCRIPTION OF EXEMPLARY EMBODIMENTS

Hereinafter, embodiments of the present disclosure will be described with reference to the drawings. The drawing to be used is appropriately enlarged or reduced so that the part to be described can be recognized.

First Embodiment

Figure 1:
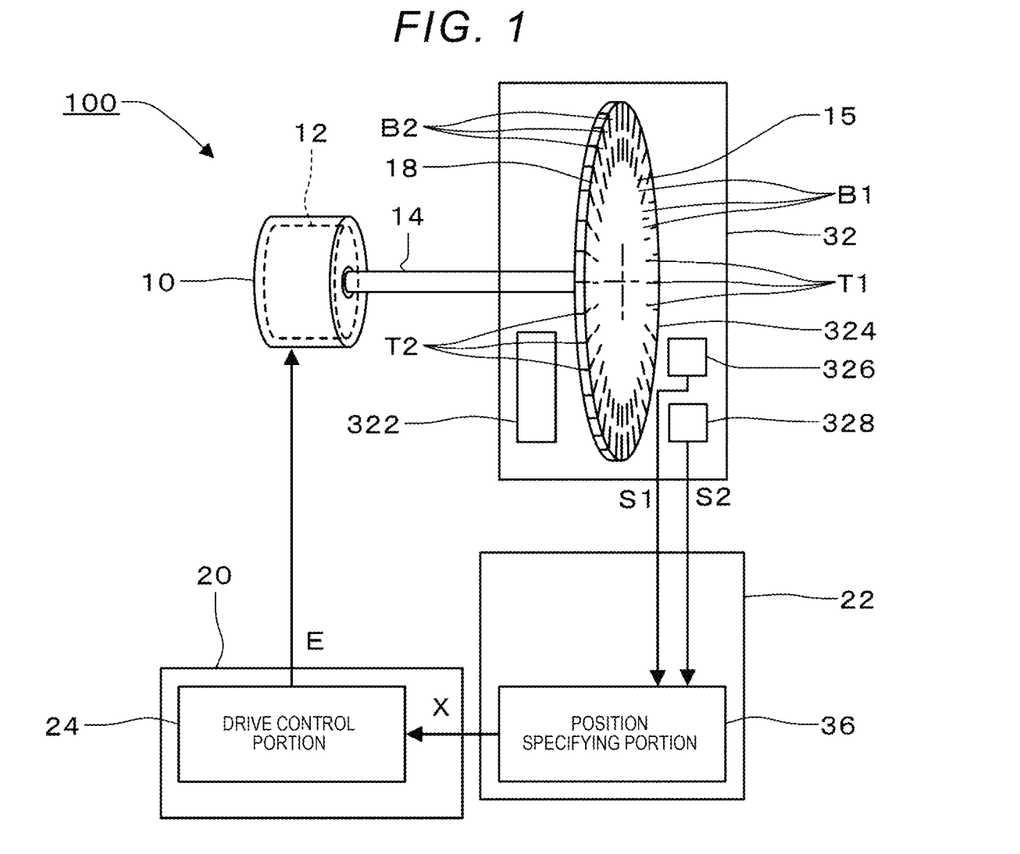
FIG. 1 is a configuration diagram of a drive control system according to a first embodiment.

FIG. 1 is a configuration diagram of a drive system 100 according to the present embodiment.

As illustrated in FIG. 1, the drive system 100 according to the present embodiment is provided with a motor 10, a signal generation portion 32 as an encoder, a position detection portion 22, and a control device 20.

The motor 10 is a two-phase stepping motor including A-phase coils and B-phase coils (not illustrated), and is provided with a rotor 12 that rotates by sequentially exciting coils of respective phases by supplying excitation current E. A rotating shaft 14 is installed on the rotor 12. The number of phases of the motor 10 is predetermined, and a single phase or three or more phases of the motor 10 can be adopted. In addition, the type of the rotor 12 is also predetermined. For example, a rotor 12 having a predetermined configuration such as PM (permanent magnet) type, VR (variable reluctance) type, HB (hybrid) type or the like can be used.

In the motor 10, the number of magnetic poles (specifically, total number of small teeth formed on each magnetic pole) is selected such that an electrical angle of L cycles (L is natural number of 2 or more) is included during one rotation of a mechanical angle of the rotor 12.

The control device 20 is a device that controls the motor 10, and is provided with a drive control portion as illustrated in FIG. 1. For example, the position detection portion 22 and the drive control portion 24 are formed of single or separate IC chips. In addition, in the present embodiment, the signal generation portion 32 is separate from the motor 10, and may be included in the configuration of the motor 10.

The signal generation portion 32 is an optical rotary encoder including a light-emitting portion 322, a rotary disc 324, a first light-receiving portion 326, and a second light-receiving portion 328. The signal generation portion 32 generates detection signals S1 and S2 in which a signal value (typically, voltage value) fluctuates periodically in conjunction with the rotation of the rotor 12.

The rotary disc 324 is a disc-shaped flat plate member whose center is fixed to the rotating shaft 14 of the rotor 12 and rotates in conjunction with the rotor 12.

Figure 2:
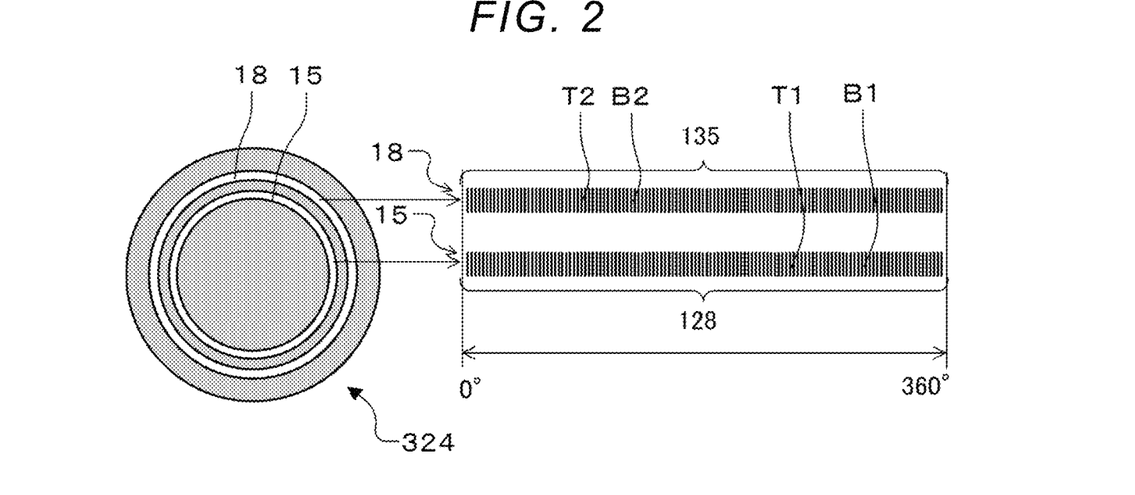
FIG. 2 is a view illustrating a rotary disc according to the first embodiment.

FIG. 2 is a view illustrating a rotary disc 324 according to the present embodiment.

The rotary disc 324 is provided with a first row 15 and a second row 18, as illustrated in FIG. 2.

In the first row 15, in order to detect the position, a trapezoidal light-transmitting portion T1 is engraved at the respective positions obtained by equally dividing a circumference of the first row 15 into M (M is natural number of 2 or more) at intervals with each other as first patterns having a predetermined width in a direction orthogonal to a radial direction. Each light-transmitting portion T1 is engraved so that the number M of a cycle 26 (refer to FIG. 4) is "128" at the cycle (pitch) 26 of the same length. In the first row 15, a plurality of light-transmitting portions T1 and light-shielding portions B1 having different optical characteristics are arranged on the circumference of a circle centered on the rotating shaft 14. The plurality of light-transmitting portions T1 are formed in the first row 15 of the rotary disc 324. The plurality of light-shielding portions B1 are formed in the first row 15 of the rotary disc 324. Each of the light-transmitting portions T1 is a slit (notch or through-hole) that allows light to pass therethrough, and is formed to be spaced apart from each other at predetermined angular intervals (interposing light-shielding portion B1 therebetween) along the circumferential direction of the rotary disc 324. Each of the light-shielding portions B1 is a region that shields light, and is formed to be spaced apart from each other at predetermined angular intervals (interposing light-transmitting portion T1 therebetween) along the circumferential direction of the rotary disc 324.

The cycle (pitch) 26 is a length from the end portion of the first pattern to the end portion of another adjacent first pattern. Specifically, the length is the sum of a width (center width) at the center of each of the first patterns (light-transmitting portion T1) which is a trapezoid in the radial direction, and a width (center width) at the center of a trapezoidal region (light-shielding portion B1) in the radial direction from the first pattern to another adjacent first pattern. The cycle 26 is not limited thereto, and may be the length obtained by equally dividing the first circumference, which is the circumference of the first row serving as the first circle, into M.

In addition, the number of cycles 26 has the same value as M which is the number of first patterns.

In the second row 18, in order to detect the position, a trapezoidal light-transmitting portion T2 is engraved at the respective positions obtained by equally dividing a circumference of the second row 18 into N (N is natural number of 2 or more) at intervals with each other as a second pattern having a predetermined width in a direction orthogonal to a radial direction. Each light-transmitting portion T2 is engraved so that the number N of a cycle 27 (refer to FIG. 4) is "135" at the cycle (pitch) 27 of the same length. In the second row 18, a plurality of light-transmitting portions T2 and light-shielding portions B2 as the second patterns are arranged on the circumference of a circle centered on the rotating shaft 14 and having a radius different from that of the first row 15. The plurality of light-transmitting portions T2 are formed in the second row 18 of the rotary disc 324. The plurality of light-shielding portions B2 are formed in the second row 18 of the rotary disc 324. Each of the light-transmitting portions T2 is a slit (notch or through-hole) that allows light to pass therethrough, and is formed to be spaced apart from each other at predetermined angular intervals (interposing light-shielding portion B2 therebetween) along the circumferential direction of the rotary disc 324. Each of the light-shielding portions B2 is a region that shields light (non-passing), and is formed to be spaced apart from each other at predetermined angular intervals (interposing light-transmitting portion T2 therebetween) along the circumferential direction of the rotary disc 324. The enlarged view on the right side of FIG. 2 linearly illustrates each of the light-transmitting portions T1 and T2 engraved on the circumference.

The cycle (pitch) 27 is a length from the end portion of the second pattern to the end portion of another adjacent second pattern. Specifically, the length is the sum of a width (center width) at the center of each of the second patterns (light-transmitting portion T2) which is a trapezoid in the radial direction, and a width (center width) at the center of a trapezoidal region (light-shielding portion B2) in the radial direction from the second pattern to another adjacent second pattern. The cycle 27 is not limited thereto, and may be the length obtained by equally dividing the second circumference, which is the circumference of the second row serving as the second circle, into N.

In addition, the number of cycles 27 has the same value as N which is the number of second patterns.

Returning to FIG. 1, the light-emitting portion 322, the first light-receiving portion 326, and the second light-receiving portion 328 are disposed at positions opposed to each other interposing the rotary disc 324 therebetween. The light-emitting portion 322 includes a light-emitting element such as a light-emitting diode, for example, and irradiates the rotary disc 324 with light. On the other hand, the first light-receiving portion 326 includes a light-receiving element such as a photodiode, for example, and generates and outputs a detection signal S1 having a voltage value corresponding to the amount of received light. In addition, the second light-receiving portion 328 includes the light-receiving element such as a photodiode, for example, and generates and outputs a detection signal S2 having a voltage value corresponding to the amount of received light.

Emitting light from the light-emitting portion 322 reaches the first light-receiving portion 326 after passing through each of the light-transmitting portions T1 of the first row 15. Emitting light from the light-emitting portion 322 reaches the second light-receiving portion 328 after passing through each of the light-transmitting portions T2 of the second row 18. The first light-receiving portion 326 includes an AB phase (not illustrated) as a light-receiving element. The second light-receiving portion 328 includes a CD phase (not illustrated) as a light-receiving element. The AB phase is a phase obtained by adding a phase of a pair of light-receiving elements A and A bar and a phase of a pair of light-receiving elements B and B bar. The CD phase is a phase obtained by adding a phase of a pair of light-receiving elements C and C bar and a phase of a pair of light-receiving elements D and D bar.

A state where the emitting light emitted from the light-emitting portion 322 passes through each of the light-transmitting portions T1 of the rotary disc 324 and reaches the first light-receiving portion 326 and a state where the emitting light is shielded by the rotary disc 324 and does not reach the first light-receiving portion 326 are alternately exchanged with each other with the rotation of the rotor 12.

In addition, a state where the emitting light emitted from the light-emitting portion 322 passes through each of the light-transmitting portions T2 of the rotary disc 324 and reaches the second light-receiving portion 328 and a state where the emitting light is shielded by the rotary disc 324 and does not reach the second light-receiving portion 328 are alternately exchanged with each other with the rotation of the rotor 12.

With the above configuration, the detection signals S1 and S2 whose voltage values periodically fluctuate in accordance with a rotational position (angle) X of the rotor 12 are output from the signal generation portion 32 (first light-receiving portion 326 and second light-receiving portion 328).

In the first row 15 of the rotary disc 324 of the signal generation portion 32 of the present embodiment, M light-transmitting portions T1 are formed. Therefore, M cycles of the detection signal S1 are included during one rotation of the rotary disc 324.

In addition, in the second row 18 of the rotary disc 324 of the signal generation portion 32, N light-transmitting portions T2 are formed. Therefore, N cycles of the detection signal S2 are included during one rotation of the rotary disc 324.

The number of cycles M of the detection signal S1 within one rotation of the rotary disc 324 is different from the number of cycles N of the detection signal S2. Specifically, the number of cycles N of the detection signal S2 exceeds the number of cycles M of the detection signal S1 (N>M). In the present embodiment, the number of cycles M of the detection signal S1 and the number of cycles N of the detection signal S2 are relatively prime numbers. That is, a greatest common divisor of the number of cycles M and the number of cycles N is 1.

In the following description, it is assumed that the number of cycles M of the detection signal S1 is "16" and the number of cycles N of the detection signal S2 is "19".

The position detection portion 22 detects the rotational position X of the rotor 12. A signal indicating the rotational position X is supplied from the position detection portion 22 to the drive control portion 24. The rotational position X can also be said to be a position (magnetic pole position) of the magnetic pole formed in the rotor 12. The drive control portion 24 controls the rotor 12 in accordance with the rotational position X detected by the position detection portion 22. For example, the drive control portion 24 rotates the rotor 12 by supplying the excitation current E to each of the coils of the A phase and the B phase, so that the difference between a target position instructed from the external device and an actual rotational position X detected by the position detection portion 22 is reduced.

The position detection portion 22 is provided with a position specifying portion 36.

The position specifying portion 36 multiplies a sine wave of the detection signal S1 to obtain $P_{slab}$ which is the position within the cycle 27 of the second row 18, and multiplies a sine wave of the detection signal S2 to obtain $P_{slcd}$ which is the position within the cycle 26 of the first row 15. When a multiplication resolution is "512", a range that can be taken is $0 \leq P_{slcd} < 512$ and $0 \leq P_{slab} < 512$.

The position specifying portion 36 obtains P'slcd which is the value of $P_{slcd}$ when $P_{slab}$ is "0" within the detected cycle 26 from the following formula (1).

$$P'_{slcd} = \{P_{slcd} - P_{slab} * (19/16)\} \bmod(P_{slmax}) \tag{1}$$

$P_{slmax}$ is the multiplication resolution. For example, $P_{slmax}$ used in the present embodiment is "512". $P'_{slcd}$ is the position within the cycle 27 of the second row 18 when the position within the cycle 26 of the currently detected first row 15 is "0". $P_{slcd}$ is the position within the cycle 27 of the second row 18. $P_{slab}$ is the position within the cycle 26 of the first row 15.

Specifically, when $P_{slmax}=512$, $P_{slab}=208$, and $P_{slcd}=247$, $P'_{slcd}=\{247-208*(19/16)\}$ MOD $(512)=\{0\}$ MOD $(512)=0$.

In addition, when $P_{slmax}=512$, $P_{slab}=16$, and $P_{slcd}=51$, $P'_{slcd}=\{51-16*(19/16)\}$ MOD $(512)=\{32\}$ MOD $(512)=32$.

As a result, by calculating the position of the second row 18 ($P'_{slcd}$) at the end 30 of the light-transmitting portion T1 of the first row 15 (refer to FIG. 4) within one cycle, $P'_{slcd}$ is a value peculiar to the cycle among all 16 cycles, so that $P'_{slcd}$ can distinguish which cycle.

The position specifying portion 36 searches for the detected cycle position. Based on the first row 15, the position specifying portion 36 searches for matching values from all 16 cycles by performing the processing of the following formula (2).

$$P''_{slcd}=0; \text{ for } (i=0;i<16;i^{++})\{\text{if } (P''_{slcd}=P'_{slcd})P''_{slcd}= [P''_{slcd}+\{(P_{slmax}*19/16)\bmod(P_{slmax})\}] \bmod(P_{slmax})\text{break};//\text{cycle position determination.}\} \tag{2}$$

The cycle position is a position obtained by dividing one cycle into a plurality of cycles.

Specifically, when $P'_{slcd}=0$, it coincides with $P''_{slcd}=0$ when i=0, so that i=0 is returned.

In addition, when $P'_{slcd}=32$, it coincides with $P'_{slcd}=32$ when i=11, so that i=11 is returned.

The position specifying portion 36 calculates an absolute position from the number (i) of the number of cycles in the first row 15 and the position ($P_{slab}$) in the cycle of the first row 15. The position specifying portion 36 calculates an absolute position (angle) of the portion of 16 cycles from the following formula (3).

$$\text{Absolute position} = (i * P_{slmax} + P_{slab}) * (360/16) \quad (3)$$

Specifically, when $P_{slmax}=512$, $P_{slab}=16$, $P_{slcd}=51$, $P'_{slcd}=32$, absolute position=$(i*P_{slmax}+P_{slab})*(360/16)=(11*512+16)*(360/16)=248.203125$.

Figure 3:
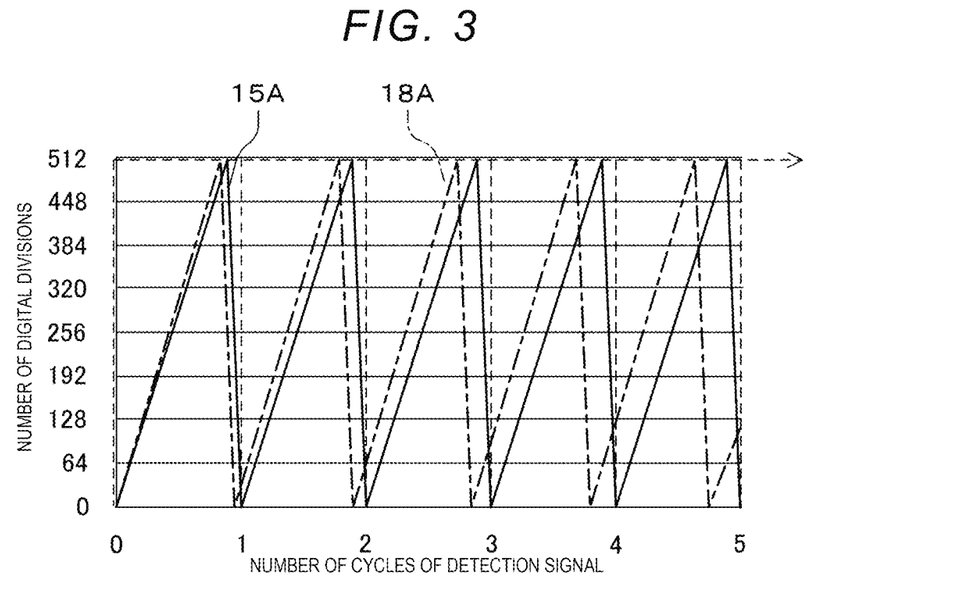
FIG. 3 is a diagram illustrating a multiplication cycle in which the number of cycles of a detection signal according to the present embodiment is "128" and the number of cycles of the detection signal is "135".

FIG. 3 is a diagram illustrating a multiplication cycle in which the number of cycles M of a detection signal S1 according to the present embodiment is "128" and the number of cycles N of the detection signal S2 is "135". The horizontal axis represents the number of cycles M of the detection signal S1 and the vertical axis represents the number of digital divisions.

The graph of FIG. 3 illustrates the number of digital divisions of the multiplication cycle of the detection signal S1 and the detection signal S2 when the detection signal S1 and the detection signal S2 are divided into "512" for one cycle by the multiplication processing.

Polygonal line 15A represents the number of digital divisions of the multiplication cycle of the detection signal S1 with respect to the number of cycles M of the detection signal S1. Polyline line 18A represents the number of digital divisions of the multiplication cycle of the detection signal S2 with respect to the number of cycles M of the detection signal S1.

According to this, since the number of cycles M of the detection signal S1 and the number of cycles N of the detection signal S2 are relatively prime numbers (relationship in which greatest common divisor is 1), the number of division between the detection signal S1 and the detection signal S2 has necessarily different combinations depending on the position. Therefore, it is possible to discriminate at which position in 360°.

Figure 4:
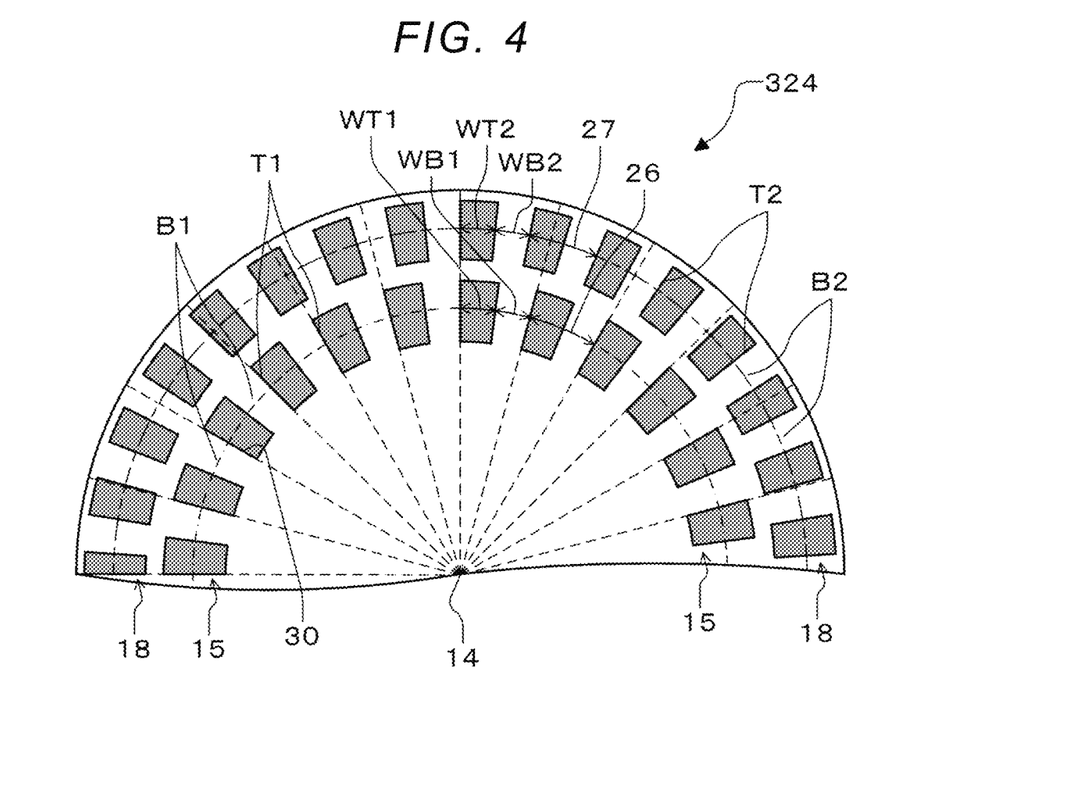
FIG. 4 is an enlarged view illustrating a rotary disc according to the first embodiment.

FIG. 4 is an enlarged view illustrating the rotary disc 324 according to the present embodiment.

As illustrated in FIG. 4, in the rotary disc 324 according to the present embodiment, the length of one pair of a center width WT1 located at the center of the light-transmitting portion T1 in the radial direction, and a center width WB1 located at the center of the light-shielding portion B1 in the radial direction, which are adjacent to each other in the first row 15 is set to one cycle (cycle 26).

In addition, in the rotary disc 324, the length of one pair of a center width WT2 located at the center of the light-transmitting portion T2 in the radial direction, and a center width WB2 located at the center of the light-shielding portion B2 in the radial direction, which are adjacent to each other in the second row 18 is set to one cycle (cycle 27).

At this time, the number of cycles M of the first row 15 and the number of cycles N of the second row 18 have a relationship that the greatest common divisor is 1.

In the rotary disc 324, the center width WT1 of the light-transmitting portion T1 of the first row 15 and the center width WT2 of the light-transmitting portion T2 of the second row 18 are the same length as each other. In addition, in the rotary disc 324, the center width WB1 of the light-shielding portion B1 of the first row 15 and the center width WB2 of the light-shielding portion B2 of the second row 18 are the same length as each other. According to this, the first light-receiving portion 326 and the second light-receiving portion 328 having the same resolution can be used for the first row 15 and the second row 18. In addition, the first pattern (light-transmitting portion T1) and the second pattern (light-transmitting portion T2) may be bright portions, and a region between the first patterns (light-shielding portion B1) and a region between the second patterns (light-shielding portion B2) may be a dark portion. In this case, the center width WT1 of the bright portion T1 of the first row 15 and the center width WT2 of the bright portion T2 of the second row 18 may be the same length as each other. The center width WB1 of the dark portion B1 of the first row 15 and the center width WB2 of the dark portion B2 of the second row 18 may be the same length as each other.

In addition, when the first patterns and the second patterns are disposed in a trapezoidal shape as a line symmetrical with respect to a straight line extending in the radial direction from the center of the circle, the position in the center in the radial direction may be a position on the straight line which is the axis of symmetry and is the center between the upper base and the lower base of the first pattern. In this case, the center width may be a length of a line segment extending in the tangential direction passing through the central position, and between the two sides. The center width may be a length of an arc between the circumference of the circle of the first row passing through the center position and the two sides, or a length of an arc between the circumference of the circle of the second row and the two sides. In addition, the position in the center in the radial direction may be the center position of the side extending of the trapezoid in the radial direction. In this case, the center width may be a length of a line segment connecting the center positions of the two sides extending in the radial direction, and between the two sides. The center width may be the length of the arc between the circumference of the circle of the first row passing through the center position and the two sides, or the length of the arc between the circumference of the circle of the second row passing through the center position and the two sides.

In the rotary disc 324, the ratio of the center width WT1 of the light-transmitting portion T1 of the first row 15 to the center width WB1 of the light-shielding portion B1 of the first row 15 is 1:1. In the rotary disc 324, the ratio of the center width WT2 of the light-transmitting portion T2 of the second row 18 to the center width WB2 of the light-shielding portion B2 of the second row 18 is 1:1. According to this, it is possible to easily detect the rotational position X of the circle centered on the rotating shaft 14.

In addition, when the first patterns (light-transmitting portion T1) and the second patterns (light-transmitting portion T2) are the bright portions, and the region between the first patterns (light-shielding portion B1) and the region between the second patterns (light-shielding portion B2) are the dark portions, the ratio of the center width WT1 of the bright portion T1 of the first row 15 to the center width WB1 of the dark portion B1 of the first row 15 may be 1:1, and the ratio of the center width WT2 of the bright portion T2 of the second row 18 to the center width WB2 of the dark portion B2 of the second row 18 may be 1:1.

The shapes of the light-transmitting portions T1 and T2 are different from each other at the first row 15 and the second row 18. For example, the shapes of the light-transmitting portions T1 and T2 may be diamonds or trapezoids. When the center widths WT1 and WT2 of the light-transmitting portions T1 and T2 are the same as each other, the shapes and areas of the light-transmitting portions T1 and T2 may be different from each other.

In addition, the shapes of the light-shielding portions B1 and B2 are different from each other at the first row 15 and the second row 18. For example, the shapes of the light-shielding portions B1 and B2 may be diamonds or trapezoids. When the center widths WB1 and WB2 of the light-shielding portions B1 and B2 are the same as each other, the shapes and areas of the light-shielding portions B1 and B2 may be different from each other.

Although the region between the patterns is defined as the light-transmitting portion or the light-shielding portion from a state where light passes or not passed, the pattern may be a reflective portion from a state where light is reflected or not reflected, and the region between the patterns may be a non-reflective portion having different optical characteristics from that of the reflective portion. In addition, when the rotary disc is made of glass, the pattern may be a mask portion (chrome is painted) and the region between the patterns may be a non-mask portion having different optical characteristics from that of the mask portion.

Figure 5:
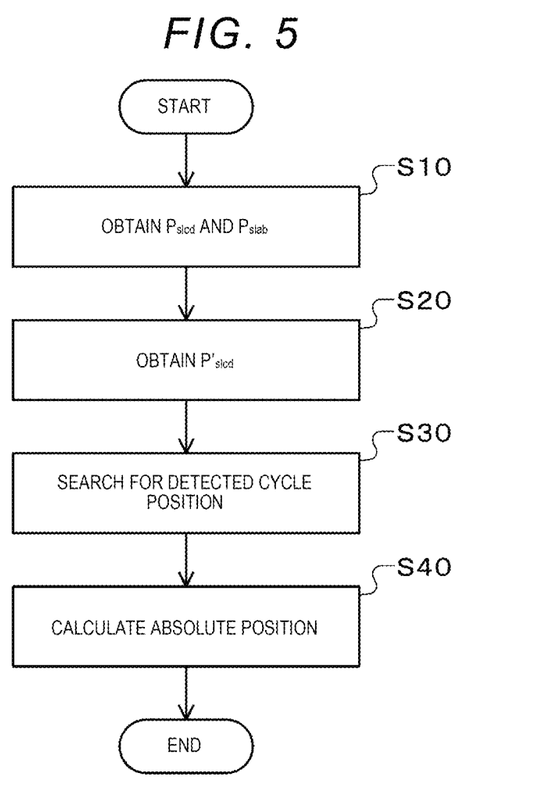
FIG. 5 is a flowchart of operation in which a position specifying portion according to the first embodiment specifies a rotational position of a rotor.

FIG. 5 is a flowchart of operation in which the position specifying portion 36 according to the present embodiment specifies the rotational position X of the rotor 12. In the following description, it is assumed that the number of cycles M of the detection signal S1 is "16" and the number of cycles N of the detection signal S2 is "19".

First, in Step S10, the position specifying portion 36 multiplies a sine wave of the detection signal S1 to obtain $P_{slab}$ which is the position within the cycle 26 of the first row 15, and multiplies a sine wave of the detection signal S2 to obtain $P_{slcd}$ which is the position within the cycle 27 of the second row 18. When the multiplication resolution is "512", the range that can be taken is $0 \leq P_{slcd} < 512$ and $0 \leq P_{slab} < 512$.

Next, in Step S20, the position specifying portion 36 obtains $P'_{slcd}$ which is a value of $P_{slcd}$ when $P_{slab}$ is 0 within the detected cycle 26 from the above formula (1).

As a result, by calculating the position of the second row 18 ($P'_{slcd}$) at the end 30 of the light-transmitting portion T1 of the first row 15 within one cycle, $P'_{slcd}$ is a value peculiar to the cycle among all 16 cycles, so that $P'_{slcd}$ can distinguish which cycle.

Next, in Step S30, the position specifying portion 36 searches for the detected cycle position. Based on the first row 15, the position specifying portion 36 searches for a value that matches among all 16 cycles by performing the processing of the above formula (2).

Next, in Step S40, the position specifying portion 36 calculates the absolute position of the portion of 16 cycles from the above formula (3).

The position specifying portion 36 calculates the absolute position from the number (i) of the number of cycles in the first row 15, which is obtained in Step S30 and the position ($P_{slab}$) in the cycle of the first row 15, which is obtained in Step S10. The processing is ended.

According to the present embodiment, the number of cycles M of the detection signal S1 and the number of cycles N of the detection signal S2 are set to have the relationship that the greatest common divisor is 1. Therefore, a combination of a position within the length of one pair of the center width WT1 located at the center of the light-transmitting portion T1 in the radial direction, and the center width WB1 located at the center of the light-shielding portion B1 in the radial direction, which are adjacent to each other in the first row 15, and a position within the length of one pair of the center width WT2 located at the center of the light-transmitting portion T2 in the radial direction, and the center width WB2 located at the center of the light-shielding portion B2 in the radial direction, which are adjacent to each other in the second row 18, on the same straight line in the radial direction, are all different combinations from each other. Therefore, the rotational position X of the circle centered on the rotating shaft 14 can be specified. Therefore, since the first light-receiving portion 326 and the second light-receiving portion 328 having the same level of resolution can be used for the first row 15 and the second row 18, the rotational position X can be detected with a simple configuration as compared with JP-UM-A-58-101173. As a result, manufacturing costs are reduced.

Second Embodiment

Figure 6:
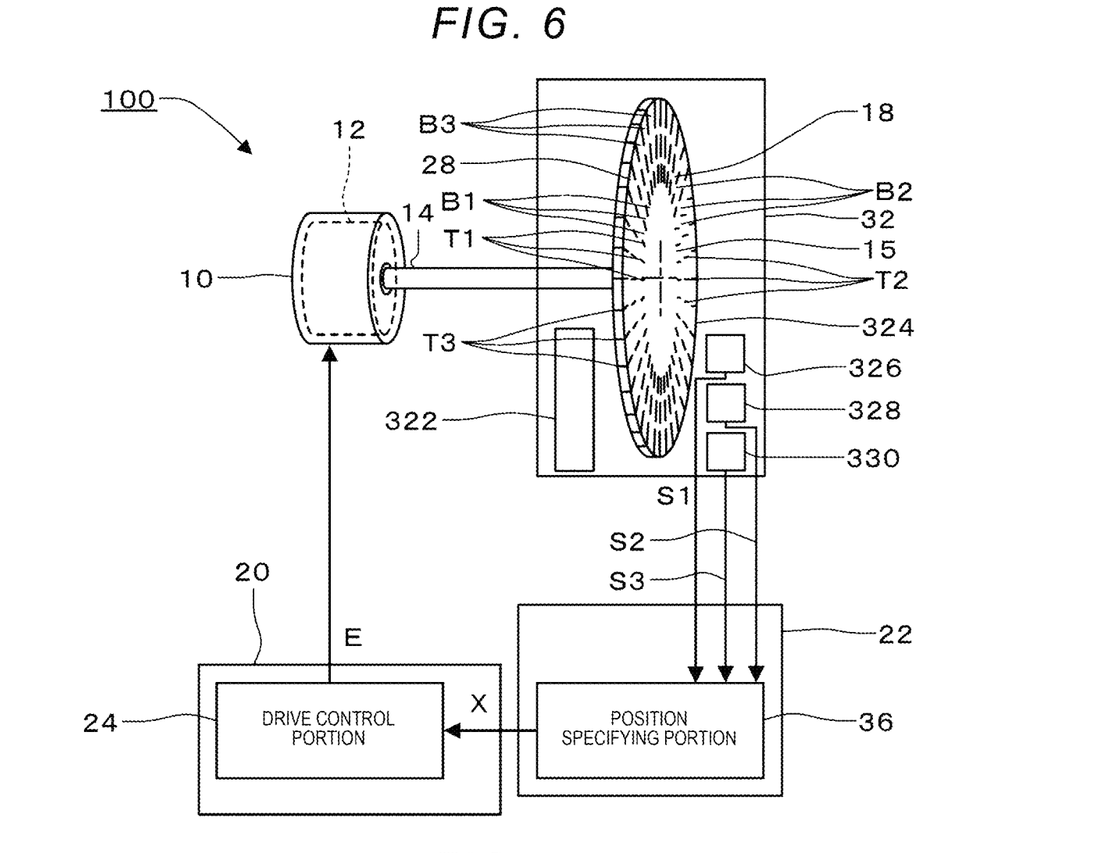
FIG. 6 is a configuration diagram of a drive control system according to a second embodiment.
Figure 7:
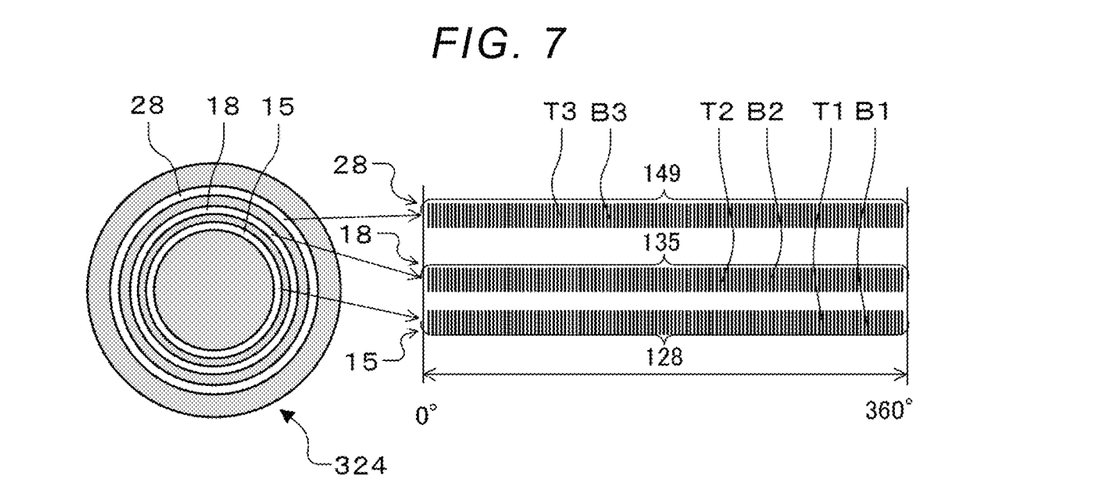
FIG. 7 is a view illustrating a rotary disc according to the second embodiment.

FIG. 6 is a configuration diagram of a drive system 100 according to a present embodiment. FIG. 7 is a view illustrating a rotary disc 324 according to the present embodiment.

Hereinafter, the drive system 100 will be described with reference to FIGS. 6 and 7.

The drive system 100 of the present embodiment is different from the first embodiment in that a third row 28 is formed in a third light-receiving portion 330 and the rotary disc 324. Hereinafter, the same reference numerals are given to the same constituent members as those of the first embodiment, and the explanation thereof will be omitted or simplified here.

The signal generation portion 32 is an optical rotary encoder including the rotary disc 324 and the third light-receiving portion 330.

The rotary disc 324 is provided with the third row 28 as illustrated in FIG. 7.

In the third row 28, in order to detect the position, a trapezoidal light-transmitting portion T3 is engraved at the respective positions obtained by equally dividing a circumference of the third row 28 into P (P is natural number of 2 or more) at intervals with each other as a third pattern. Each light-transmitting portion T3 is engraved so that the number of cycle P is "149" at the cycle (pitch) of the same length. In the third row 28, a plurality of light-transmitting portions T3 and light-shielding portions B3 are arranged on the circumference of a circle centered on the rotating shaft 14. The plurality of light-transmitting portions T3 are formed in the third row 28 of the rotary disc 324. The plurality of light-shielding portions B3 are formed in the third row 28 of the rotary disc 324. Each of the light-transmitting portions T3 is a slit (notch or through-hole) that allows light to pass therethrough, and is formed to be spaced apart from each other at predetermined angular intervals (interposing light-shielding portion B3 therebetween) along the circumferential direction of the rotary disc 324. Each of the light-shielding portions B3 is a region that shields light, and is formed to be spaced apart from each other at predetermined angular intervals (interposing light-transmitting portion T3 therebetween) along the circumferential direction of the rotary disc 324. The enlarged view on the right side of FIG. 7 linearly illustrates each of the light-transmitting portions T3 engraved on the circumference.

The cycle (pitch) is a length from the end portion of the third pattern to the end portion of another adjacent third pattern. Specifically, the length is the sum of a width (center width) at the center of the third pattern (light-transmitting portion T3) which is a trapezoid in the radial direction, and a width (center width) at the center of a trapezoidal region (light-shielding portion B3) in the radial direction from the third pattern to another adjacent third pattern. The cycle is not limited thereto, and may be the length obtained by equally dividing the third circumference, which is the circumference of the third row serving as the third circle, into P.

In addition, the number of cycles has the same value as P which is the number of third patterns.

Returning to FIG. 6, the light-emitting portion 322 and the third light-receiving portion 330 are disposed at positions opposed to each other interposing the rotary disc 324 therebetween. The third light-receiving portion 330 includes a light-receiving element such as a photodiode, for example, and generates and outputs a detection signal S3 having a voltage value corresponding to the amount of received light.

Emitting light from the light-emitting portion 322 reaches the third light-receiving portion 330 after passing through each of the light-transmitting portions T3 of the third row 28. The third light-receiving portion 330 includes an EF phase (not illustrated) as a light-receiving element. The EF phase is a phase obtained by adding a phase of a pair of light-receiving elements E and E bar and a phase of a pair of light-receiving elements F and F bar.

A state where the emitting light emitted from the light-emitting portion 322 passes through each of the light-transmitting portions T3 of the rotary disc 324 and reaches the third light-receiving portion 330 and a state where the emitting light is shielded by the rotary disc 324 and does not reach the third light-receiving portion 330 are alternately exchanged with each other with the rotation of the rotor 12.

With the above configuration, the detection signal S3 whose voltage value periodically fluctuates in accordance with the rotational position X of the rotor 12 are output from the signal generation portion 32 (third light-receiving portion 330).

Figure 8:
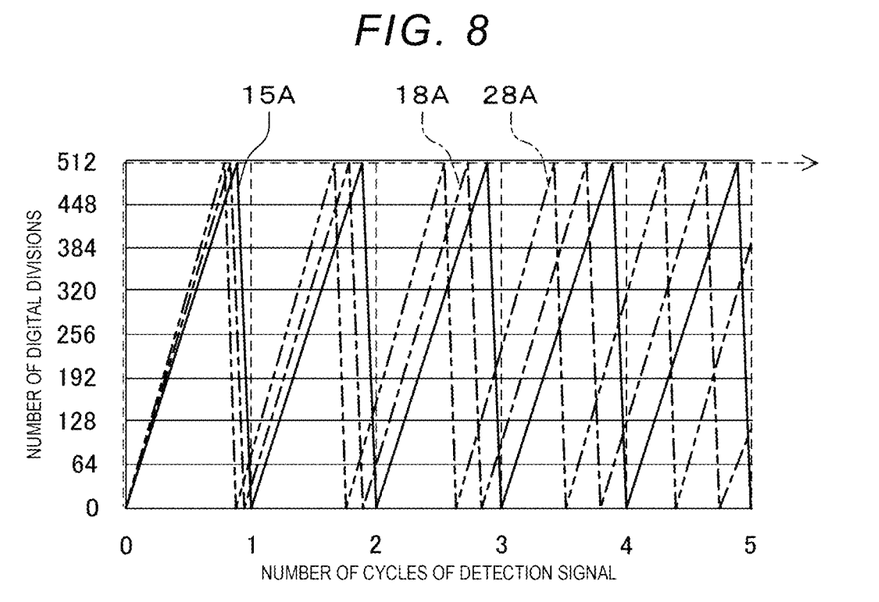
FIG. 8 is a diagram illustrating a multiplication cycle in which the number of cycles of a detection signal according to the second embodiment is "128", the number of cycles of the detection signal is "135", and the number of cycles of the detection signal is "149".

FIG. 8 is a diagram illustrating a multiplication cycle in which the number of cycles M of the detection signal S1 according to the present embodiment is "128", the number of cycles N of the detection signal S2 is "135", and the number of cycles P of the detection signal S3 is "149". The horizontal axis represents the number of cycles M of the detection signal S1 and the vertical axis represents the number of digital divisions.

The graph of FIG. 8 illustrates the number of digital divisions of the multiplication cycle of the detection signal S3 when the detection signal S3 is divided into "512" for one cycle by the multiplication processing.

Polygonal line 28A represents the number of digital divisions of the multiplication cycle of the detection signal S3 with respect to the number of cycles M of the detection signal S1.

According to this, since the number of cycles M of the detection signal S1 and the number of cycles N of the detection signal S2 are relatively prime numbers (relationship in which greatest common divisor is 1), the number of division between the detection signal S1 and the detection signal S2 has necessarily different combinations depending on the position. Therefore, it is possible to discriminate at which position in 360°.

Robot

Figure 9:
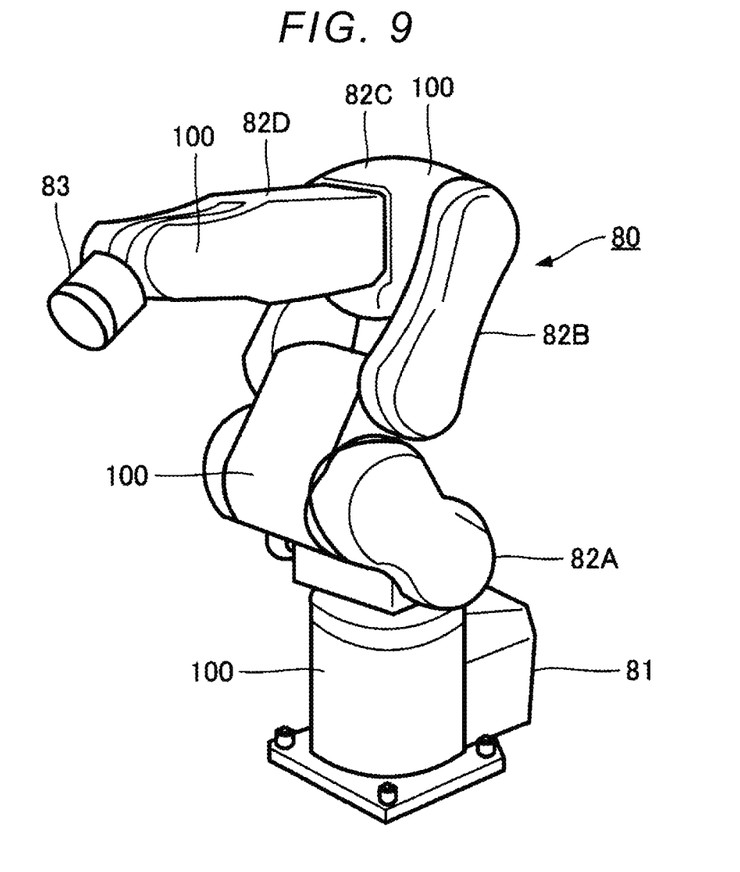
FIG. 9 is an external view of an industrial robot using a drive system according to the present embodiment.

FIG. 9 is an external view of an industrial robot using the drive system 100 according to the present embodiment.

As illustrated in FIG. 9, the robot 80 according to the present embodiment is a vertically articulated robot including a base 81, a plurality of arms 82 (82A, 82B, 82C, and 82D), and a wrist 83. Each of the plurality of arms 82 is sequentially connected via a pivoting shaft (joint), and the drive system 100 of each of the above-described embodiments is installed on each pivoting shaft. The motor 10 of the drive system 100 pivots the arm 82 on one side of the pivoting shaft with respect to the arm 82 on the other side. In addition, the arm 82A on the base end side is pivotably supported with respect to the base 81, and the wrist 83 is pivotably supported on the arm 82D on the tip end side. The motor 10 of the drive system 100 installed inside the base 81 pivots the arm 82A with respect to the base 81 and the motor 10 of the drive system 100 installed on the arm 82D pivots the wrist 83. On the tip end surface of the wrist 83, for example, a manipulator for holding a precision instrument such as a wristwatch is mounted.

The drive system 100 according to the above-described embodiments is not limited to the robot 80 in FIG. 9. For example, it is possible to adopt the drive system 100 for various electronic devices such as NC processing machine and 3D printer.

In addition, the robot on which the motor 10 is mounted may be other than the above-described robot 80, and is not particularly limited. The robot on which the motor 10 is mounted may be a vertically articulated robot other than a ceiling hanging robot, or a robot with a degree of freedom of 5 axes or less or 7 axes or more, or a dual arm robot.

According to the present embodiment, the same effects as those of the above-described drive system 100 are realized.

Modification Example

Each of the embodiments exemplified above can be variously modified. Specific embodiments of modification are exemplified below. Two or more embodiments randomly selected from the following examples can be appropriately merged within a range not mutually contradictory.

(1) In each of the above embodiments, the optical rotary encoder is exemplified as the signal generation portion 32, and a magnetic rotary encoder may be used as the signal generation portion 32. Specifically, the signal generation portion 32 is provided with a magnetic gear that rotates in conjunction with the rotor 12 and a magnetic field detection element (for example, Hall element) installed in the vicinity of the magnetic gear. The magnetic field detection element generates and outputs detection signals S1, S2, and S3 by detecting a magnetic field changing in conjunction with the rotation of the magnetic gear. As understood from the above example, the signal generation portion 32 of each of the above-described embodiments is comprehensively expressed as an element for generating the detection signals S1, S2, and S3 whose signal values fluctuate in conjunction with the rotor 12.

(2) In each of the above-described embodiments, the A phase of the motor 10 is excited, and the excitation target for realizing the specific excitation state is not limited to the A phase. For example, in a configuration using a multi-phase motor 10 of three or more phases, a specific excitation state is realized by exciting any one phase among a plurality of phases.

Hereinafter, contents derived from the embodiments will be described.

The encoder includes a rotary disc that rotates around a rotating shaft, and a sensor that detects a rotational position of the rotary disc, in which the rotary disc is provided with first patterns and second patterns, the first patterns are arranged at positions obtained by equally dividing a first circumference which is a circumference of a first circle into M (M is natural number of 2 or more) at intervals, the second patterns are arranged at positions obtained by equally dividing a second circumference which is a circumference of a second circle which is a concentric circle of the first circle and has a different radius from that of the first circle into N (N is natural number of 2 or more) at intervals, and M and N are different from each other and a greatest common divisor of M and N is 1.

According to this, the number of cycles of the first row and the number of cycles of the second row are set to have the relationship that the greatest common divisor is 1. Therefore, a combination of a position within the length of one pair of the center width located at the center of the bright portion in the radial direction, and the center width located at the center of the dark portion in the radial direction, which are adjacent to each other in the first row, and a position within the length of one pair of the center width located at the center of the bright portion in the radial direction, and the center width located at the center of the dark portion in the radial direction, which are adjacent to each other in the second row, on the same straight line in the radial direction, are all different combinations from each other. Therefore, the rotational position of the circle centered on the rotating shaft can be specified. Therefore, since the sensor having the same level of resolution can be used for the first row and the second row, the rotational position can be detected with a simple configuration as compared with JP-UM-A-58-101173. As a result, manufacturing costs are reduced.

In the encoder, a width at a center of each of the first patterns in a radial direction and a width at a center of each of the second patterns in a radial direction may be the same length as each other, and a width of a center between the first patterns in the radial direction and a width at a center between the second patterns in the radial direction may be the same length as each other.

According to this, the sensor having the same resolution can be used for both the first row and the second row.

In the encoder, a ratio of the width at the center of each of the first patterns in the radial direction to the width at the center between the first patterns in the radial direction may be 1:1, and a ratio of the width at the center of each of the second patterns in the radial direction to the width at the center between the second patterns in the radial direction may be 1:1.

According to this, it is possible to easily detect the rotational position of the circle centered on the rotating shaft.

The motor includes the encoder according to any one of the above.

According to this, the same effect as the above encoder is realized.

The robot includes the motor described above.

According to this, the same effect as the above encoder is realized.

What is claimed is:

1. An encoder comprising:
a rotary disc that rotates around a rotating shaft; and
a sensor that detects a rotational position of the rotary disc, wherein
the rotary disc is provided with first patterns and second patterns,
the first patterns are arranged at positions obtained by equally dividing a first circumference which is a circumference of a first circle into M (M is natural number of 2 or more) at intervals,
the second patterns are arranged at positions obtained by equally dividing a second circumference which is a circumference of a second circle which is a concentric circle of the first circle and has a different radius from that of the first circle into N (N is natural number of 2 or more) at intervals, and
M and N are different from each other and a greatest common divisor of M and N is 1,
wherein a width at a center of each of the first patterns in a radial direction and a width at a center of each of the second patterns in a radial direction are the same length as each other, the width being a length of a line segment connecting the center positions of the two sides of the first pattern or the second pattern extending in the radial direction, and between the two sides.

2. The encoder according to claim 1, wherein
a width of a center between the first patterns in the radial direction and a width at a center between the second patterns in the radial direction are the same length as each other.

3. The encoder according to claim 1, wherein
a ratio of the width at the center of each of the first patterns in the radial direction to the width at the center between the first patterns in the radial direction is 1:1, and
a ratio of the width at the center of each of the second patterns in the radial direction to the width at the center between the second patterns in the radial direction is 1:1.

4. A motor comprising:
a rotary disc that rotates around a rotating shaft; and
a sensor that detects a rotational position of the rotary disc, wherein
the rotary disc is provided with first patterns and second patterns,
the first patterns are arranged at positions obtained by equally dividing a first circumference which is a circumference of a first circle into M (M is natural number of 2 or more) at intervals,
the second patterns are arranged at positions obtained by equally dividing a second circumference which is a circumference of a second circle which is a concentric circle of the first circle and has a different radius from that of the first circle into N (N is natural number of 2 or more) at intervals, and
M and N are different from each other and a greatest common divisor of M and N is 1,
wherein a width at a center of each of the first patterns in a radial direction and a width at a center of each of the second patterns in a radial direction are the same length as each other, the width being a length of a line segment connecting the center positions of the two sides of the first pattern or the second pattern extending in the radial direction, and between the two sides.

5. A robot comprising:
a motor that includes a rotating shaft; and
an encoder that includes
a rotary disc which rotates around the rotating shaft, and
a sensor which detects a rotational position of the rotary disc, wherein
the rotary disc is provided with first patterns and second patterns,
the first patterns are arranged at positions obtained by equally dividing a first circumference which is a circumference of a first circle into M (M is natural number of 2 or more) at intervals,
the second patterns are arranged at positions obtained by equally dividing a second circumference which is a circumference of a second circle which is a concentric circle of the first circle and has a different radius from that of the first circle into N (N is natural number of 2 or more) at intervals, and
M and N are different from each other and a greatest common divisor of M and N is 1,
wherein a width at a center of each of the first patterns in a radial direction and a width at a center of each of the second patterns in a radial direction are the same length as each other, the width being a length of a line segment connecting the center positions of the two sides of the first pattern or the second pattern extending in the radial direction, and between the two sides.

* * * * *